(No Model.)

W. MILLER.
OVEN FOR OIL, GAS, OR GASOLINE STOVES.

No. 350,635. Patented Oct. 12, 1886.

WITNESSES
INVENTOR
Wm Miller
By his Attorney

United States Patent Office.

WILLIAM MILLER, OF GRAND RAPIDS, MICHIGAN.

OVEN FOR OIL, GAS, OR GASOLINE STOVES.

SPECIFICATION forming part of Letters Patent No. 350,635, dated October 12, 1886.

Application filed January 2, 1886. Serial No. 187,462. (No model.)

*To all whom it may concern:*

Be it known that I, WILLIAM MILLER, a citizen of the United States, residing at Grand Rapids, in the county of Kent and State of Michigan, have invented certain new and useful Improvements in Ovens for Oil, Gas, or Gasoline Stoves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
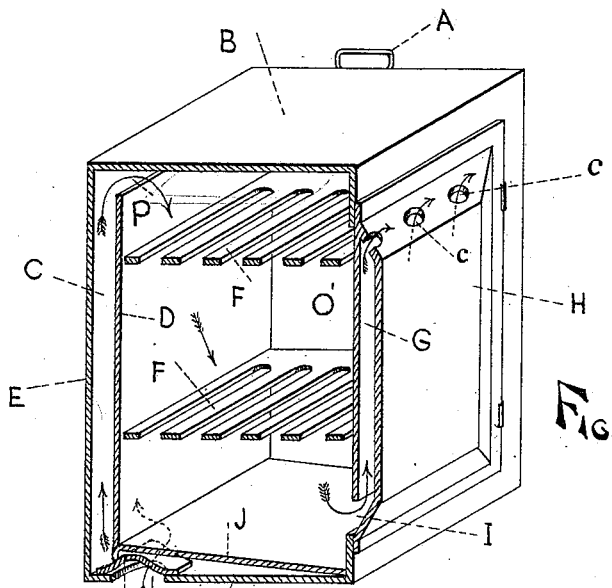
Figure 2:
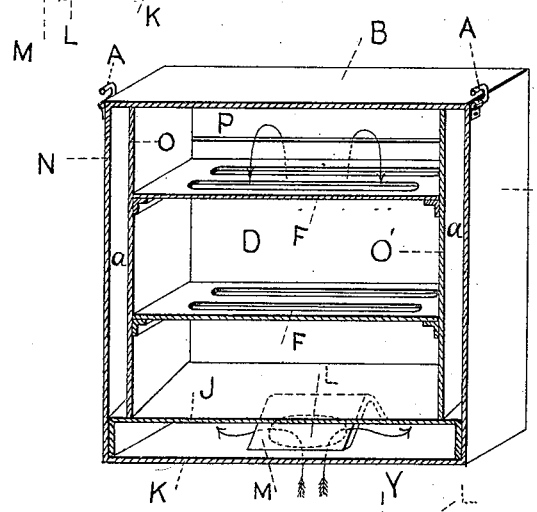
Figure 3:
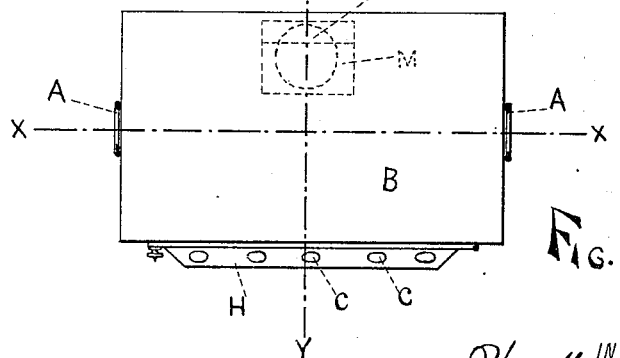

Figure 1 is a sectional view on the line Y Y of Fig. 3. Fig. 2 is a sectional view on the line X X of Fig. 3. Fig. 3 is a plan view.

Similar letters refer to similar parts throughout the several views.

The object of my invention is to secure a speedy and economical distribution of heated air throughout the oven, and by such rapid distribution prevent the overheating commonly occurring upon the bottom.

My invention consists in the details of construction and combinations of parts hereinafter fully described and claimed.

Referring to the drawings, B represents the oven, within which is placed the inclined and removable false bottom J, the front edge of which rests upon the true bottom rising as it goes back above the deflector M, and supported by turning down the side edges, as shown in Fig. 2. The same piece turned upward forms the false back D, leaving an open space between the false and true back forming the flue C, and an opening, P, at the top of said false back to permit the discharge of heated air into the oven. Directly over the bottom opening, L, is placed the deflector $m$, bent at an oblique angle, so that the heated air striking it is deflected and passed backward through the flue C into the oven. An open space is left between the top of said deflector and the false bottom, to prevent the overheating of the latter. Upon entering the oven the heated air is drawn downward to the front of the oven, and the door of the same being made hollow, with an opening, I, at the bottom and vents $c\ c\ c$ at the top, forming a flue, passes upward and is discharged through said vents.

O O' are the false sides, leaving dead-air spaces $a\ a$ on the sides; F F, the grates or shelves; A A, the handles, and K the bottom of the oven; H, the door, and E the back.

All the interior parts of this oven, including the false back D and bottom J, are removable, allowing the easy and thorough cleansing of the same and all parts thereof.

I am aware that, previous to my invention, an oven has been provided with a jacket or covering forming a flue. I am also aware that an oven has been provided with an opening in its bottom, covered by a raised perforated plate and that the door of an oven has been provided with a flue, and do not seek to claim such construction; but What I do claim, and desire to secure by Letters Patent, is—

The combination, with an oven having an opening in its bottom, of an imperforate obliquely-bent deflector, M, over said opening, a removable false bottom resting on the bottom of the oven at one end and bent to form side flanges for supporting the other end above the bottom, said false bottom being turned upwardly at one end to form a back flue open at its upper end, the door having a flue open at its upper and lower ends, and the false sides resting on the false bottom and supporting the shelves, as set forth.

In testimony whereof I affix my signature in presence of two witnesses.

WILLIAM MILLER.

Witnesses:
 WM. A. CHAPMAN,
 ADOLPH B. MASON.